United States Patent [19]

Aalto et al.

[11] Patent Number: 4,678,005
[45] Date of Patent: Jul. 7, 1987

[54] FLOW REGULATOR

[75] Inventors: Erkki Aalto; Veikko Ylä-Hemmilä, both of Kausala, Finland

[73] Assignee: Halton Oy, Finland

[21] Appl. No.: 695,363

[22] Filed: Jan. 7, 1985

[30] Foreign Application Priority Data

May 20, 1983 [FI] Finland .................................. 831799

[51] Int. Cl.⁴ ....................... F16K 31/12; F16K 17/00
[52] U.S. Cl. ..................................... 137/499; 137/519
[58] Field of Search ............... 137/519, 556, 557, 499; 251/285, 286, 287, 305; 138/45, 46

[56] References Cited

U.S. PATENT DOCUMENTS

| 41,644 | 2/1864 | Shaw | 251/287 |
|---|---|---|---|
| 1,281,645 | 7/1918 | Penzensky . | |
| 1,306,006 | 6/1919 | Gustafson | 251/285 |
| 1,311,202 | 7/1919 | Anderson | 137/499 |
| 1,766,876 | 6/1930 | Busby . | |
| 2,581,748 | 1/1952 | Blum | 137/499 |
| 3,538,945 | 11/1970 | Dean, Jr. | 137/499 |
| 3,905,390 | 9/1975 | Pysh | 137/519 |
| 4,420,438 | 12/1983 | Goosen | 251/305 |
| 4,523,609 | 6/1985 | Weck | 137/499 |

FOREIGN PATENT DOCUMENTS

| 74254 | 3/1918 | Austria | 137/519 |
|---|---|---|---|
| 2448271 | 4/1976 | Fed. Rep. of Germany . | |
| 2635338 | 4/1978 | Fed. Rep. of Germany . | |
| 3128726 | 2/1983 | Fed. Rep. of Germany . | |
| 64995 | 10/1983 | Finland . | |
| 775544 | 12/1934 | France | 137/519 |
| 1313310 | 11/1962 | France . | |
| 2392302 | 12/1978 | France . | |
| 48558 | 5/1917 | Sweden . | |
| 302677 | 7/1968 | Sweden . | |
| 400391 | 3/1978 | Sweden . | |

Primary Examiner—Martin P. Schwadron
Assistant Examiner—Sheri M. Novack
Attorney, Agent, or Firm—Steinberg & Raskin

[57] ABSTRACT

The present invention concerns a flow regulator for gaseous substances, particularly a flow regulator intended for air in air-conditioning and ventilation installations, for maintaining the volumetric flow of the gaseous substance at desired magnitude with sufficient accuracy when the differential pressure acting across the flow regulator varies within given limits. The flow regulator comprises an envelope and a regulating member turnably disposed in the flow passage confined by the envelope. The torque produced by the flow of gaseous substance on the regulating member and on the other hand a countertorque dependent on the position of the regulating member cause the regulating member turning in the flow passage to assume a position of equilibrium such that the requisite pressure drop is obtained for maintaining the volumetric flow rate at predetermined magnitude. The regulating member is substantially slightly curved at least in the flow surface facing the incoming flow of the gaseous substance. The turning angle between the initial and ultimate positions of the regulating member is substantially the same at volumetric flows of different magnitudes when the differential pressure range is the same. The initial and ultimate positions of the regulating member are dependent on the magnitude of the volumetric flow when the differential pressure is the same.

22 Claims, 17 Drawing Figures

FLOW REGULATOR

BACKGROUND OF THE INVENTION

The present invention concerns a flow regulator for gaseous substances, in particular for air in air-conditioning and ventilation installations, serving to maintain the volumetric flow of a gaseous substance at desired magnitude with sufficient accuracy when the differential pressure across the flow regulator varies within given limits, said flow regulator comprising an envelope and a regulating member turnably disposed in a flow passage confined by the envelope, and which, when the differential pressure increases, turn progressively towards a position at right angles to the direction of flow, the torque exerted by the flow of the gaseous substance on the regulating member and on the other hand, a countertorque dependent on the position of the regulating member, causing the regulating member turning in the flow passage to assume a position of equilibrium in which the required pressure drop is obtained for keeping the volumetric flow at predetermined magnitude.

In low pressure regulators of prior art, which allow fairly wide regulation of the volumetric flow set-point, the lowest pressure at which the means starts to operate increases with increasing volumetric flow rate. Even at small volumetric flows, the lowest pressure is usually relatively high. The high end pressure also increases with increasing volumetric flow rate set-point.

Because the lowest pressure is high and/or because it depends on the volumetric flow set-point value, the regulators of prior art, in order to function, require extra blower energy and possibly a bigger blower; owing to the increase of pressure they tend to cause noise problems; they impede the designing work, and they cause difficulties in the implementation phase of the installation.

In general, the setting of the volumetric flow in flow regulators at the site of installation with accuracy and steplessly is exceedingly difficult and often impossible in practice, particularly if the regulator has been installed already, and it is also a fact that the flow rate setting cannot be directly read. Regulators of prior art also do not allow the throttling pressure to be read with which the regulator impedes the flow. It is true that in certain regulator designs of prior art, one may observe from the outside whether the regulator is within its operating range, but they allow no regulation of the volumetric flow rate.

A prerequisite of serial manufacturing, storing, distribution and convenient use of regulators is that they can with ease and accuracy be regulated at the site of installation, also after installation. It is important with a view to the balancing and inspection of an air-conditioning installation that it is possible to observe from outside the regulator which set-point value of volumetric flow has been selected, whether the regulator is within its operating range, and how strongly the regulator throttles the flow.

In addition, the basic construction and the manufacturing technology of the regulator shall be such that the required calibration measures are as simple and as few as possible and independent of the setting of volumetric flow. In regulators known at present, the movement of the regulating member cannot be steplessly limited. Therefore, regulators of prior art cannot be used at all for mere balancing based on so-called single pass regulation, which would eliminate the risk of binding of the means. Secondly, regulators of prior art cannot be used for restricted and controlled correction. Thirdly, regulators of prior art cannot be used in the best possible way in air-conditioning installations where the air quantities are varied, e.g. different air quantities in the daytime and during the night.

In regulators of prior art, the force that is used to counteract the regulating member is a mass or a spring, or a spring and bellows in combination. Each design has its advantages and disadvantages. Disadvantages connected with the use of springs are e.g. their relaxing, inaccuracies of manufacture, liability to suffer damage, etc. Disadvantages encountered when a mass is used as counterforce are the facts that the regulator can only be installed in a horizontal duct or passage, that the axis has to be horizontal with reference to the direction of flow at all times and that the mass must always be on one and the same side of the passage. Advantages of a mass in the role of counterforce are, for instance, reliability in use, manufacturing accuracy and permanece. Disadvantages of the use of springs combined with bellows are that the design is more liable to disturbances and more expensive than a mere spring and has shorter life span.

In regulators of prior art, a particular damping means is required to allay the oscillations, or hunting, of the regulating member. In some designs of prior art, damping of the dashpot type is used. In another regulator of prior art, bellows type damping is used. Disadvantages of the damping designs described above are, for instance, that the damping designs may in the course of time either bind or be blocked or break, that they require maintenance, and that they may impair the accuracy.

SUMMARY OF THE INVENTION

The object of the invention is to provide an improvement of regulator designs known in the art. A more detailed aim of the invention is to provide a flow regulator in which the drawbacks present in regulators of the prior art are overcome.

The aims of the invention are achieved by a flow regulator the characteristic features of which are presented in the claims following below.

The regulator of the invention is primarily characterized in that at least one of the halves of the regulating member, with reference to the turning angle, is substantially slightly curved at least in the flow surface facing the flow of the gaseous substance.

In an advantageous embodiment of the invention, the flow regulator is characterized in that when the regulating member turns in the range of operation of the flow regulator, a part of the flow surface of the regulating member is left in the shadow of the flow surface as viewed in the flow direction of the gaseous substance. In an advantageous embodiment, when the regulating member turns in the range of operation of the flow regulator, at least part of one of the halves of the flow surface of the regulating member, with reference to the turning shaft, is left in the shadow of the flow surface of the opposite half of the regulating member, as viewed in the flow direction of the gaseous substance. In an advantageous embodiment, when the regulating member is turning in the range of operation of the flow regulator, a part of the flow surface of the regulating member is left in the shadow of the regulating member, when viewed in the perpendicular direction against the flow direction of the gaseous substance and the turning shaft.

In an advantageous embodiment, when the regulating member is turning in the range of operation, at least part of one of the halves of the flow surface of the regulating member, with reference to the flow regulator, is left in the shadow of the flow surface of the opposite half of the regulating member, as at right angles against the flow direction of the gaseous substance and the turning shaft.

Several advantageous embodiments of the invention are characterized in that in the flow passage, particularly at the highest volumetric flow rate set-point value, there is no other element causing substantial throttling than the turning regulating member. This enables the lower pressure to be made low enough.

Several advantageous embodiments of the invention are characterized in that the regulating member is a slightly curved plate. The turning angle between the initial and ultimate positions of the regulating member is substantially of the same order at different volumetric flow rates, the differential pressure being the same. The initial and ultimate positions of the regulating member are dependent on the magnitude of the volumetric flow rate, the differential pressure being the same. The flow regulator is advantageously provided with adjustable and/or self-adjusting limiting members to limit the differential pressure range of the flow regulator, the limiting members being disposed to limit the angular movement of the regulating member. The operating range of the flow regulator is also advantageously changeable by changing the effective flow aperture between the regulating member and the flow passage. Similarly, the operating range of the flow regulator is advantageously changeable by the aid of a shiftable mass causing a countertorque dependent on the position of the regulating member.

By the flow regulator of the invention several remarkable advantages are gained. Firstly, the set-point value of the flow regulator can be regulated in a relatively wide volumetric flow range e.g. duct velocity 2-8 m/s, without any change of the pressure range in which the flow regulator operates. In addition, the flow regulator operates with lower differential pressure, e.g. about 20 Pa, than any regulator known in prior art, where the operating range is 20-200 Pa throughout. In the regulator of the invention, it has been understood to make use of a turning angle of the regulating member about 90°, thus affording, with additional adjustment of the effective flow aperture, a large movement of the regulating member relative to the change of differential pressure, and a relatively wide operating range.

Secondly, in the regulator of the invention the volumetric flow rate can be regulated steplessly and simply at the site of installation, even if the regulator has already been installed, simply by turning a control knob on the flow regulator. The volumetric flow rate may be directly read on a scale, as well as the degree in which the regulator throttles the flow, and whether the regulator is within its operating range, i.e., whether the regulator admits the correct air quantity, or too little or too much.

Thirdly, in the flow regulator of the invention the movement of the regulating member may be limited, or the movement of the regulating member may, if needed, be entirely arrested. Thanks to this caracteristic feature, the flow regulator of the invention may also be used in applications such as balancing based merely on so-called single pass regulation. Secondly, the flow regulator may be used for minor controlled correction, and thirdly the flow regulator may successfully be used in air-conditioning installations where centralized altering of the air flows is desirable.

In the flow regulator of the invention, a mass is used advantageously for counterforce. However, in the regulator of the invention the disadvantages of a mass have been eliminated in practice. The flow regulator of the invention may be installed in a passage with any direction, and the mass used for counterforce can be disposed on either side of the passage or duct. This is based on the fact that the turning axis of th regulating member is mounted horizontally by the aid of a levelling means provided in the flow regulator, and the mass is moreover so positioned that the mass is turned through the same angle but in opposite direction as is the deviation of the particular instance of the installation from a separately determined basic installation.

The flow regulator of the invention also required no separate oscillation inhibiting means, certainly no oscillation inhibitor which would be likely to bind or accumulate dirt or be blocked: as a rule the counterpressure in the duct system is alone enough to keep the regulating member stable. Factors contributing to this favourable feature are in the first place that the regulating member is slightly curved and that the regulating does not nearly completely close the passage in any position. As a result, the air is enabled to flow past on all sides of the regulating member even when the regulating member is in the "closed" position. Further factors contributing to the favourable feature just described are for instance the size and shape of the regulating member, the location of the turning axis of the regulating member with reference to the regulating member, the size and location of the counterweight, and the limiters of the regulating member.

Thanks to the slightly curved regulating member, the flow regulator can be made accurate, silent, and a slightly curved regulating member like this moves smoothly from one end position to the other.

BRIEF DESCRIPTION OF THE DRAWINGS

The invention is described in detail, referring to an advantageous embodiment of the invention presented in the figures of the drawing attached, but to which the invention is not meant to be exclusively confined.

DESCRIPTION OF THE PREFERRED EMBODIMENTS

Figure 1:
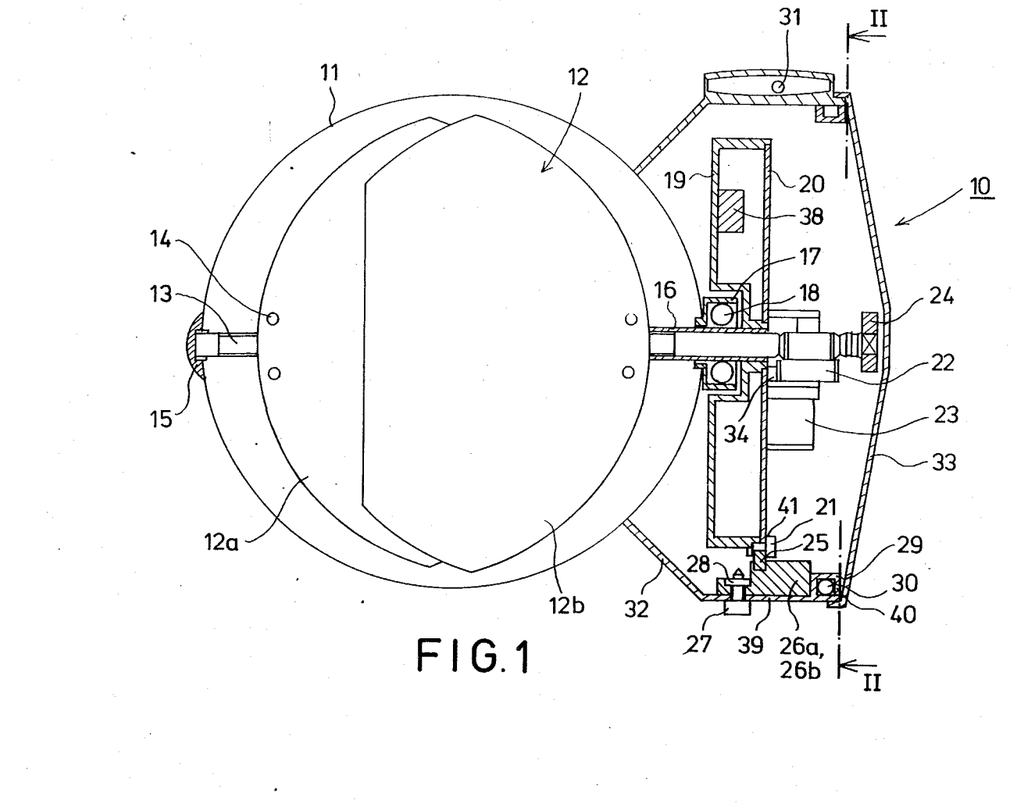
FIG. 1 presents an advantagous embodiment of the invention in partly sectioned elevational view.
Figure 2:
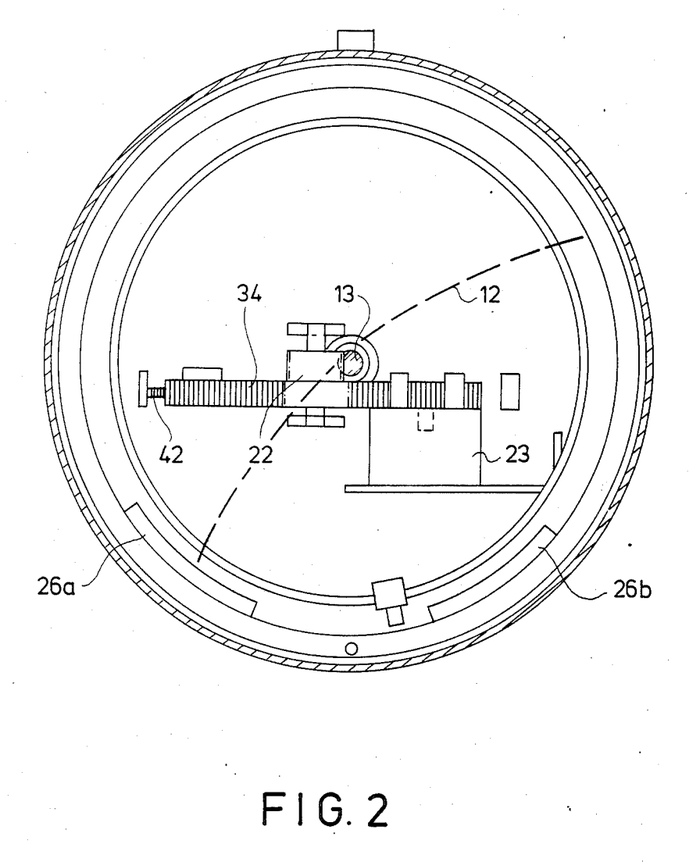
FIG. 2 shows the section along the line II—II in FIG. 1.
Figure 3A:
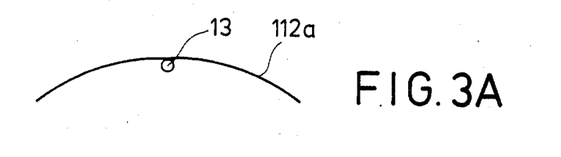
FIG. 3A presents in schematic elevational view an advantageous embodiment of the regulating member utilized in the flow regulator of the invention.
Figure 3B:
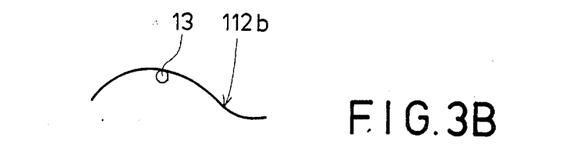
FIG. 3B presents in schematic elevational view a second advantageous embodiment of the regulating member utilized in the flow regulator of the invention.
Figure 3C:
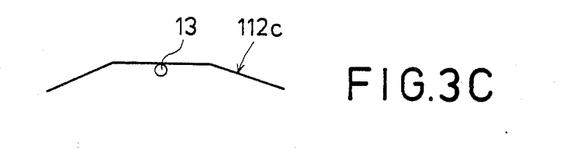
FIG. 3C presents in schematic elevational view a third advantageous embodiment of the regulating member utilized in the flow regulator of the invention.
Figure 3D:
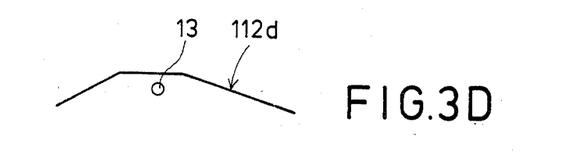
FIG. 3D presents in schematic elevational view a fourth advantageous embodiment of the regulating member utilized in the flow regulator of the invention.
Figure 3E:
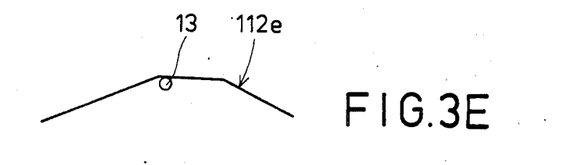
FIG. 3E presents in schematic elevational view a fifth advantageous embodiment of the regulating member utilized in the flow regulator of the invention.
Figure 3F:
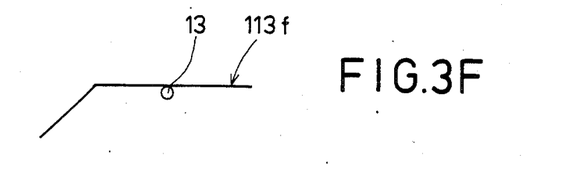
FIG. 3F presents in schematic elevational view a sixth advantageous embodiment of the regulating member utilized in the flow regulator of the invention.

In the embodiment of FIGS. 1 and 2, the constant flow regulator of the invention has been generally indicated by reference numeral 10. The regulator 10 comprises an envelope 11 and a regulating member 12 disposed within the envelope 11. In this embodiment, the regulating member 12 is a curved flap-like regulating member composed of two curved flaps 12a and 12b overlapped with each other. The regulating member 12 is attached to a turnable shaft 13 by the aid of a regulating and fixing nut 14 and a combined sleeve, regulating and fixing nut 16. the shaft 13 is rotatably carried by bearings 15 and 18 in the envelope 11. The regulating member 12 turns by effect of the air flowing in the flow passage confined by the envelope 11, and the countertorque generated by the weight 23 is disposed to set the regulating member 12 in a position producing the requisite throttling. The weight 23 is integrally connected with the regulating member 12 by means of the sleeve, control and fixing nut 16 and by a member 19 and cover 20 rotatably attached thereto, and it rotates along with the turning of the regulating member 12. The axis 13 is installed horizontally by the aid of a balance and a levelling ball 31 in the protecting case 32.

The operating range of the constant flow regulator 10, as regards volumetric flow rate, can be changed by turning the regulating knob 24, whereby in this embodiment, the size of the flap-resembling regulating member 12 and simultaneously the effective flow aperture, the location of the weight 23 and the initial and ultimate positions of the regulating member 12 are changed. The halves 12a and 12b of the flap-like regulating member 12 move in different directions with reference to each other on the shaft 13, by effect of the different-handed threads on the shaft 13 and in the regulating nuts 14,16. One end of the shaft 13 is laterally fixed in the bearing 15, whereby the effect of the adjustment also causes the member 19, which has by mediation of the sleeve 16 been mounted on the flap-like closing member 12 on one half 12b thereof rotatably, and the cover, attached to said member 19, to move in the direction of the shaft 13. The gear 22 attached to the cover 20 is in contact with the shaft 13, and the gear 22 is due to the pinion rack formed by grooves on the shaft 13 and to the sidewise movement of the rotatably disposed member 19 set in rotation, whereby the gear 22 at the same time by means of the pinion rack 34 shifts the weight 23.

In FIGS. 3A–3F are presented some advantageous embodiments of the regulating member 12 employed in the regulator 10 of the invention. In FIGS. 3A–3D, the halves of the regulating member 112a, 112b, 112c and 112d, with reference to the turning shaft 13, are slightly curved, whereas in FIGS. 3E and 3F only one of the halves of the regulating member 112e and 113f is slightly curved.

Figure 4A:
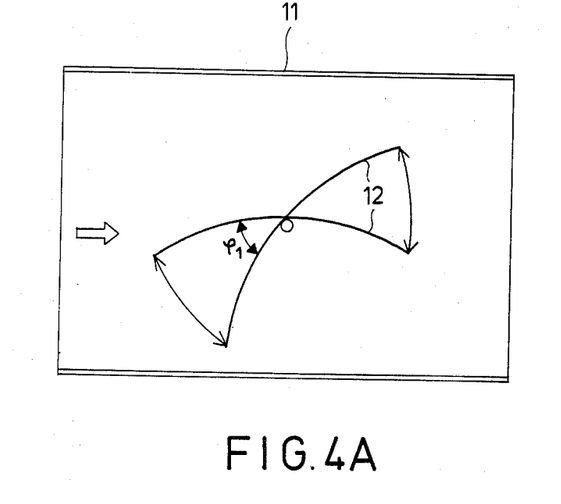
FIG. 4A presents in elevational view the initial and utlimate positions of the regulating member of the flow regulator at high volumetric flow rate.
Figure 4B:
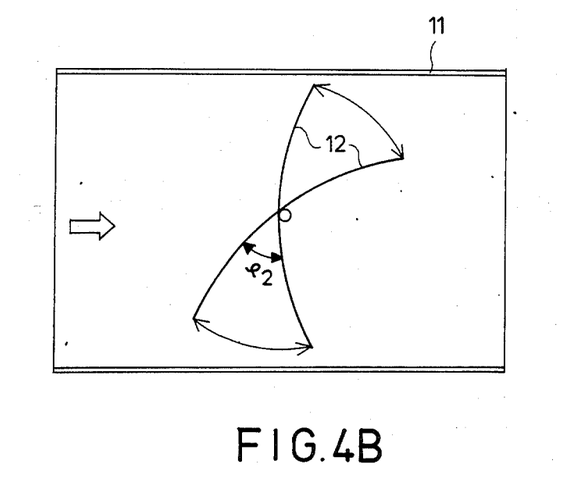
FIG. 4B presents in elevational view the initial and ultimate positions of the regulating member of the flow regulator at low volumetric flow rate.

In FIGS. 4A and 4B is observed that at high volumetric flow rate, at the smallest differential pressure of the operating range, the regulating member 12 is in a more horizontal position than at a small volumetric flow rate at the corresponding differential pressure.

Similarly, it is observed that at a small volumetric flow rate at the highest differential pressure of the operating range, the regulating member 12 is in a more vertical position than at a large volumetric flow at the corresponding differential pressure.

The position of the regulating member 12 at the highest volumetric flow rate and at the smallest differential pressure of the operating range advantageously deviates about 90° from the position of the regulating member 12 at the smallest volumetric flow rate and the highest differential pressure of the operating range. In contrast, the turning angle $\phi_2$ is substantially of the same order as the respective turning angle $\phi_1$ for high volumetric flow rate when the differential pressure is the same. Thus, in the regulator 10 of the invention the rotation angle $\phi_1$, $\phi_2$ of the regulating member 12 for the minimum and maximum differential pressures is substantially of the same order at the different volumetric flow rates. At the same minimum and maximum values of the differential pressure $\Delta p$, the angle of rotation $\phi_1$, $\phi_2$ is advantageously about 60°.

Figure 5A:
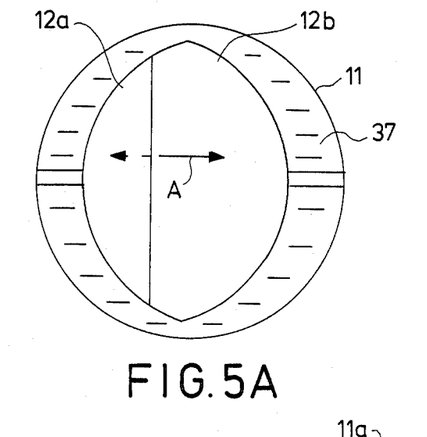
FIG. 5A presents the effective flow aperture of the flow regulator of the invention at its smallest, with the regulating member so regulated that the effective flow aperture is large, viewed in the direction of flow.
Figure 5B:
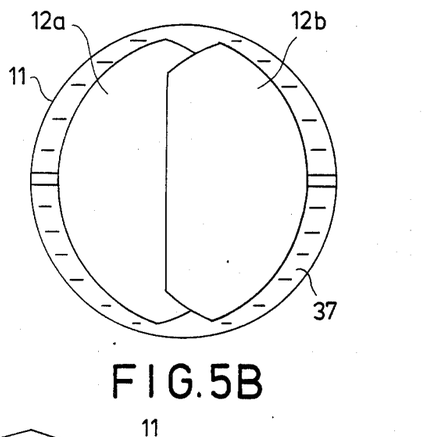
FIG. 5B presents the effective flow aperture of the flow regulator of the invention at its smallest, with the regulating member so regulated that the effective flow aperture is small, viewed in the direction of flow.

In the embodiment of FIGS. 5A and 5B, in the flow regulator 10 of the invention, the effective flow aperture 37 is changed by regulating the size of the regulating member 12. In this embodiment, the size of the effective flow aperture 37 is changed by moving the halves 12a and 12b of the flap-resembling regulating member 12 in the manner indicated by the arrow A in FIG. 5A.

Figure 5C:
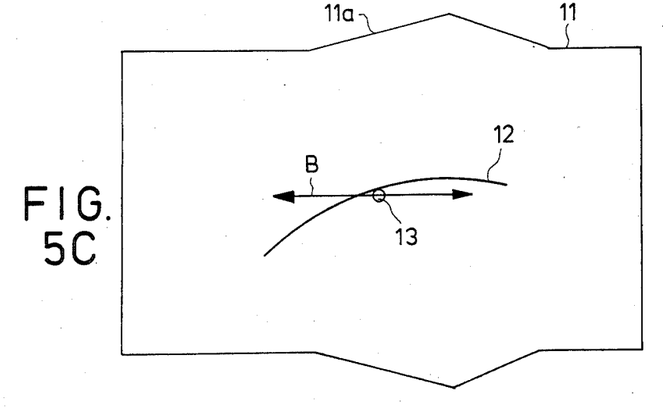
FIG. 5C illustrates in elevational view the changing of the effective flow aperture of the flow regulator in a flow passage with variable cross section.

In the embodiment of FIG. 5C, the effective flow aperture 37 is changed by moving the regulating member 12 in the flow passage 11, 11a with variable cross-section as indicated by the arrow B, in other words, by shifting the regulating member 12 in the direction of flow.

Figure 5D:
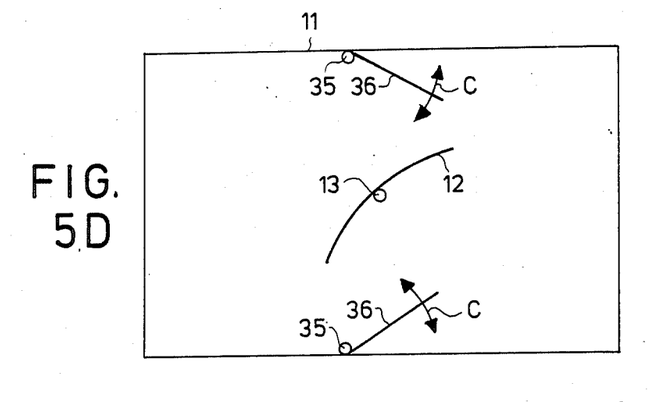
FIG. 5D illustrates in elevational view the changing of the effective flow aperture of the flow regulator by means of a separate regulating member.

In the embodiment of FIG. 5D, the effective flow aperture 37 is changed by regulating the flow aperture by the aid of a separate regulating member 36, consisting of one or several parts, placed in the flow passage. The shafts of the regulating members 36 are denoted by the reference numeral 35. The regulating members 36 may be rotated around the axes 35 as indicated by arrows C.

Figure 6:
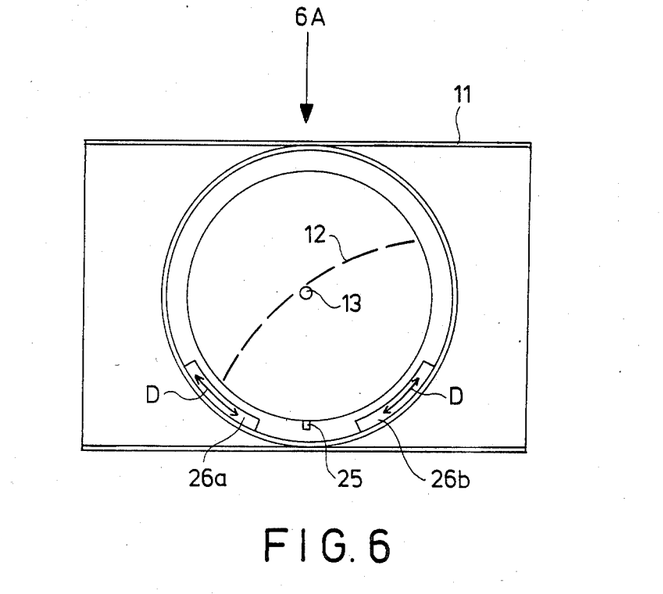
FIG. 6 presents the principle of limiting the differential pressure range of the flow regulator, in a schematic elevational view.
Figure 7:
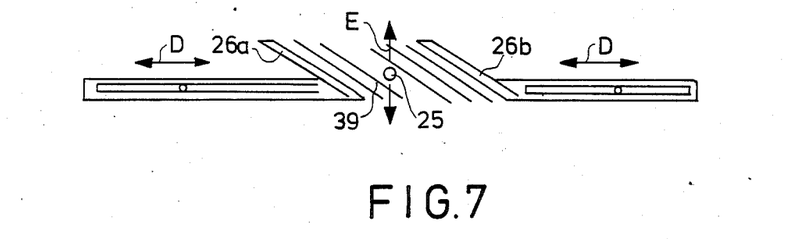
FIG. 7 shows a detail of FIG. 6 viewed in the direction 6A.

In the flow regulator 10 of the invention, the differential pressure range is limited by limiting members 25 and 26a, 26b. When the limiters 26a and 26b are moved as indicated by arrows D in FIG. 6, the movement of the regulating member 12 is limited. The limiters 26a and 26b are advantageously self-regulating limiting members in accordance with the volumetric flow rate that has been selected, as shown in FIG. 7. The limiters 26a and 26b have bevelled faces in that case. The limiters 26a and 26b regulate themselves when a limiter pin 25 moves as the volumetric flow rate is regulated, in the manner indicated by the arrow E in FIG. 7. The movement of the flap-like regulating member 12 of the constant flow regulator 10 may also be arrested totally or partially with the aid of the adjustable limiters 26a and 26b. The limiter pin 25 and the adjusting scale 39 on the protective case 32 indicate the differential pressure Δp acting across the constant flow regulator 10. When the limiter pin 25 touches the limiter 26a, the differential pressure Δp is at the lowest, and at the limiter 26b *it is at the highest (FIG. 7). When the limiter pin 25 is intermediate between the limiters 26a and 26b,* the means is in the operating range; if not, either too much or too little air is admitted.

Figure 8:
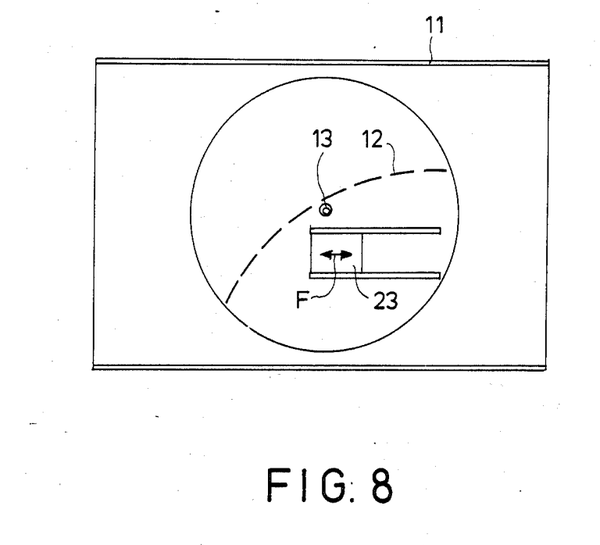
FIG. 8 shows a way of changing the operating range of the flow regulator of the invention, in a schematic elevational view.

As shown in FIG. 8, the operating range of the flow regulator 10 can be changed by the aid of a movable mass or weight 23 by shifting the weight 23 as indicated by the arrow F.

The weight 23 and the limiting members 25 and 26a, 26b automatically assign different initial and ultimate positions to the flap-like regulating member 12 at different volumetric flow rates.

In the constant flow regulator 10 of the invention, the effect of gravity can be made the same independent of the installation mode by the aid of the fixable cover 20 which is adjustable with reference to the turning axle 13 of the regulating member 12, of the ball case 29 on the protecting case 32 and of the ball 30 moving in the case 29. The constant flow regulator 10 is balanced by a balancing weight 38 in connection with manufacturing, first without the countertorque produced by the weight 23. The ball 30 and the scale 40 on the case 29 show in which position the means is. The cover 20 is turned to a position corresponding to the position indicated by the ball 30 by the aid of a scale 41 on the cover 20 and is locked by a set screw 21.

In the foregoing only a few advantageous embodiments of the invention have been presented, and it is obvious to a person skilled in the art that numerous modifications thereof are feasible within the scope of the inventive idea presented in the claims following below. For instance, it is not meant to restrict the invention exclusively to ducts with circular cross section.

We claim:

1. A flow regulator for gaseous substance, particularly for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member turnably disposed in a flow passage confined by the envelope, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure drop for maintaining the volumetric flow at pre-selected magnitude is achieved, characterized in that there is at least one position in the operating range of turning of the flow regulator, wherein at least a part of a flow surface of the regulating member is left in a shadow of the flow surface thereof as viewed in the direction of flow of the gaseous substance.

2. A flow regulator for gaseous substances, particularly for air and air-conditioning and ventilation installtions, for maintaining the volumetric flow rate of the gaseous substance at desired magnitude with sufficient accuracy when differential pressure acting across the flow regulator varies within given limits, said flow regulator comprising an envelope and a regulating member mounted on a shaft turnably disposed in a flow passage confined by the envelope to define a pair of regulator member segments on opposed sides of said shaft, said member disposed to turn with increasing differential pressure progressively crosswise with reference to the direction of flow and assume an equilibrium position in response to a torque produced by the gaseous substance on the flow regulating member and a countertorque dependent on the position of the regulation member, such that the requisite pressure drop for maintaining the volumetric flow at pre-selected magnitude is achieved, characterized in that there is at least one position in the operating range of turning of the flow regulator, wherein at least a part of a flow surface of one segment of the regulating member is left in a shadow of the flow surface of the opposite segment of the regulating member as viewed in the direction of flow of the gaseous substance.

3. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member mounted on a shaft turnably disposed in a flow passage confined by the envelope, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure drop for maintaining the volumetric flow at pre-selected magnitude is achieved, characterized in that there is at least one position in the operating range of turning of the flow regulator, wherein at least a part of a flow surface of the regulating member is left in a shadow of the flow surface thereof as viewed at right angles to the direction of flow of the gaseous substance and the turning shaft.

4. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said folw regulator comprising an envelope and a regulating member mounted on a shaft turnably disposed in a flow passage confined by the envelope to define a pair of regulator member segments on opposed sides of said shaft, said member disposed to turn with increasing differential pressure progressively crosswise with reference to the direction of flow and assume an equilibrium position in response to a torque produced by the gaseous substance on the flow regulating member and a countertorque dependent on the position of the regulating member, such that the requisite pressure drop for maintaining the volumetric flow at pre-selected magnitude is achieved, characterized in that there is at least one position in the operating range of turning of the flow regulator, wherein at least a part of one of the two segments forming a flow surface of the regulating member, is left in a shadow of the flow surfce of the opposite segment of the regulating member, as viewed at right angles against the direction of flow of the gaseous substance and the turning shaft.

5. A flow regulator according to claim 1, characterized in that the flow passage is free from any fixed elements causing substantial throttling.

6. A flow regulator according to claim 1 characterized in that the regulating member is a slightly curved plate.

7. A flow regulator according to claim 1, characterized in that a turning angle between initial and ultimate positions of the regulating member is substantially of the same magnitude at volumetric flows of different magnitudes when the differential pressure range is the same.

8. The regulator of claim 7, wherein said turning angle is about 60°.

9. A flow regulator according to claim 1, characterized in that initial and ultimate positions of the regulating member are dependent on the magnitude of the volumetric flow when the differential pressure range is the same.

10. A flow regulator according to claim 1, characterized in that the flow regulator is provided with adjustable or self-adjusting limiters for limiting the differential pressure range of the flow regulator, said limiting members being disposed to limit the turning movement of the regulating member.

11. The regulator of claim 10, additionally comprising a limiter pin movably situated between a pair of said limiters, said pin being movable in response to changes in the differential pressure.

12. A flow regulator according to claim 1, characterized in that the operating range of the flow regulator is changeable by the aid of a shiftable mass producing a countertorque dependent on the position of the regulating member.

13. A flow regulator according to claim 1, characterized in that the range of operation of the flow regulator is changeable by changing an effective flow aperture between the regulating member and the flow passage.

14. The regulator of claim 13, wherein said regulating member comprises adjustable portions disposed to be adjustable towards or away from one another to thereby vary size of said effective flow aperture.

15. The regulator of claim 13, wherein said flow passage is of varying cross-section and said regulating member is disposed to be movable along said flow passage of varying cross-section to thereby vary size of said effective flow aperture.

16. The regulator of claim 13, additionally comprising a second regulating member, and
a second shaft on which said second regulating member is mounted, said second regulating member being adjustable to thereby vary size of said effective flow aperture.

17. The regulator of claim 16, additionally comprising a third shaft, and
a third regulating member adjustably mounted on said third shaft.

18. The regulator of claim 1, additionally comprising means for producing the countertorque.

19. The regulator of claim 2, wherein both segments of the regulating member are curved.

20. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member mounted on a shaft turnably disposed in a flow passage confined by the envelope to define a pair of regulator member segments on opposed sides of said shaft, said member disposed to turn with increasing differential pressure progressively cross-wise with reference to the direction of flow and assume an equilibrium position in response to a torque produced by the gaseous substance on the flow regulating member and a countertorque dependent on the position of the regulating member, such that the requisite pressure drop for maintaining volumetric flow at pre-selected magnitude is achieved, characterized in that at least one of the two segments of the regulating member being substantially slightly curved at least in a flow surface facing the flow of the incoming gaseous substance, the operating range of the flow regulator is changeable by the aid of a shiftable mass producing a countertorque dependent on the position of the regulating member, and wherein said shaft is threaded, said regulating member is in the form of two separate flaps, each flap threadingly engaged with said shaft independent from the other flap, and additionally comprising means for adjusting size of said regulating member position of said mass, comprising knob means connected with said shaft for turning the same, gear means interconnecting said mass and said shaft, with position of said mass and position of said flaps of said regulating member being shifted by rotation of said shaft by said knob means.

21. A flow regulator for gaseous substances, particularly for air in air-conditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member mounted on a shaft turnably disposed in a flow passage confined by the envelope to define a pair of regulator member segments on opposed sides of said shaft, said member disposed to turn with increasing differential pressure progressively cross-wise with reference to the direction of flow and assume an equilibrium position in response to a torque produced by the gaseous substance on the flow regulating member and a countertorque dependent on the position of the regulating member, such that the requisite pressure drop for maintaining the volumetric flow at pre-selected magnitude is achieved, characterized in that at least one of the two segments of the regulating member being substantially slightly curved at least in a flow surface facing the flow of the incoming gaseous substance, the operating range of the flow regulator is changeable by the aid of a shiftable mass producing a countertorque dependent on the position of the regulating member, and wherein said mass is interconnected with said regulating member through a sleeve situated about said shaft, a rotatable member, and a cover thereof, whereby said mass rotates along with rotation of said regulating member.

22. A flow regulator for gaseous substances, particularly for air in airconditioning and ventilation installations, for maintaining the volumetric flow rate of the gaseous substance at desired magnitude with sufficient accuracy when differential pressure acting across the flow regulator varies within given limits, said flow regulator comprising an envelope and a regulating member mounted on a shaft turnably disposed in a flow passage confined by the envelope to define a pair of regulator member segments on opposed sides of said shaft, said member disposed to turn with increasing differential pressure progressively cross-wise with reference to the direction of flow and assume an equilibrium position in response to a torque produced by the gaseous substance on the flow regulating member and a countertorque dependent on the position of the regulating member, such that the requisite pressure drops for maintaining the volumetric flow at pre-selected magnitude is achieved, characterized in that at least one of the two segments of the regulating member being substantially sligtly curved at least in a flow surface facing the flow of the incoming gaseous substance, and additionally comprising means for substantially horizontally maintaining said shaft, which comprise a protective casing, and a levelling ball disposed in said protective casing.

* * * * *